US011512715B2

(12) United States Patent
Rusnák et al.

(10) Patent No.: US 11,512,715 B2
(45) Date of Patent: Nov. 29, 2022

(54) DEVICE FOR PROTECTION OF WASTEWATER PUMPS FOR WET ACCUMULATION CHAMBERS

(71) Applicant: Aqua4um s.r.o., Nitra (SK)

(72) Inventors: Roman Rusnák, Nitra (SK); L'uboš Krivuš, Mojmírovce (SK); L'uboš Hurban, Kuchyňa (SK); Tomáš Matulik, Lozorno (SK)

(73) Assignee: Aqua4um s.r.o., Nitra (SK)

( * ) Notice: Subject to any disclaimer, the term of this patent is extended or adjusted under 35 U.S.C. 154(b) by 147 days.

(21) Appl. No.: 16/768,213

(22) PCT Filed: Dec. 11, 2018

(86) PCT No.: PCT/SK2018/050016
§ 371 (c)(1),
(2) Date: May 29, 2020

(87) PCT Pub. No.: WO2019/117821
PCT Pub. Date: Jun. 20, 2019

(65) Prior Publication Data
US 2020/0370568 A1    Nov. 26, 2020

(30) Foreign Application Priority Data
Dec. 13, 2017    (SK) .............................. 50119-2017 U

(51) Int. Cl.
*C02F 1/00* (2006.01)
*F04D 29/70* (2006.01)
(Continued)

(52) U.S. Cl.
CPC ........... *F04D 29/708* (2013.01); *F04D 13/14* (2013.01); *F04D 7/045* (2013.01); *F04D 13/16* (2013.01)

(58) Field of Classification Search
CPC ........ F04D 29/708; F04D 13/14; F04D 7/045; F04D 13/16
(Continued)

(56) References Cited

U.S. PATENT DOCUMENTS

| | | | | |
|---|---|---|---|---|
| 1,607,248 A | * | 11/1926 | Durdin, Jr. ................. | F04D 7/04 |
| | | | | 417/40 |
| 5,954,484 A | * | 9/1999 | Strate ....................... | F04D 7/045 |
| | | | | 417/427 |
| 6,387,266 B1 | * | 5/2002 | Drda ......................... | C02F 3/006 |
| | | | | 210/197 |

FOREIGN PATENT DOCUMENTS

| | | | | |
|---|---|---|---|---|
| DE | 2065096 A1 | * | 6/1972 | ............... E03F 5/22 |
| DE | 2065096 A1 | | 6/1972 | |

(Continued)

OTHER PUBLICATIONS

International Preliminary Report on Patentability Application No. PCT/SK2018/050016 Completed: Oct. 14, 2019 17 Pages.
(Continued)

*Primary Examiner* — Hung Q Nguyen
*Assistant Examiner* — Anthony Donald Taylor, Jr.
(74) *Attorney, Agent, or Firm* — Whitmyer IP Group LLC

(57) ABSTRACT

A device for protection of wastewater pumps for wet accumulation chambers has a separation chamber provided with a discharge pipe for discharging wastewater into a sewerage network. A supply pipe connected to the separation chamber supplies solid particles containing wastewater into the separation chamber. A reversing valve arranged between the supply pipe and the separation chamber prevents reverse flow of wastewater into the supply pipe. A bidirectional pipe connected to the separation chamber connects the separation chamber with a pump, where the bidirectional pipe serves to supply wastewater from the separation chamber into the pump positioned in the wet accumulation chamber and for
(Continued)

reverse flow of wastewater from the pump into the separation chamber to a discharge pipe. A solid particles separator arranged between the separation chamber and the bidirectional pipe separates solid particles contained in wastewater in the separation chamber.

7 Claims, 4 Drawing Sheets

(51) Int. Cl.
  *F04D 13/14* (2006.01)
  *F04D 7/04* (2006.01)
  *F04D 13/16* (2006.01)
(58) Field of Classification Search
  USPC .................................................. 210/172.3
  See application file for complete search history.

(56) References Cited

FOREIGN PATENT DOCUMENTS

| | | | | |
|---|---|---|---|---|
| EP | 1860245 | A1 | 11/2007 | |
| PL | 1860245 | A1 * | 11/2007 | ............... E03F 5/22 |

OTHER PUBLICATIONS

International Search Report and Written Opinion of the International Searching Authority Application No. PCT/SK2018/050016 Completed: Jun. 3, 2019; dated Jun. 11, 2019 8 Pages.

\* cited by examiner

DEVICE FOR PROTECTION OF WASTEWATER PUMPS FOR WET ACCUMULATION CHAMBERS

TECHNICAL FIELD

The present teaching relates to a device for protection of pumps in communal wastewater pumping stations, those from industry, agriculture, rain water or drinking and raw water.

BACKGROUND

At present bar screen baskets and manually or mechanically scraped bar screens or sieves are used for capturing solid particles in wastewater pumping stations. Accordingly, current technologies require frequent human intervention into the process. However, long-term and comprehensive experiences in operating such pumping stations show that said devices suffer from significant drawbacks. Necessary handling of caught solid particles (rakings) that have to be removed from the pumping station and transported to a waste dump or to a wastewater treatment plant is a disadvantage of baskets, bar screens and sieves.

There are also cases when no devices for separating those particles are installed into pumping stations. In those cases pumps having greater throughput rate and comprising crushing devices are chosen.

When choosing a pump enjoying a greater throughput rate, pumping over greater solid particles anticipated in wastewater is provided, however, it is a common practice that greater solid particles in wastewater tend to clump. If a pump sucks such a cluster having dimensions greater than a maximum possible throughput of an impeller of the respective pump the pump blocks. Such situations occur in practice quite often.

On the other hand, pumps comprising a crushing device often suffer from rapid abrasion of crushing devices resulting in their non-functioning. Consequently, the pumps are blocked and damaged, which require physical cleaning of pumps or their maintenance.

In these cases operation services of pumping stations are financially demanding due to frequent dispatch of maintenance workers to pumping stations. Handling the rakings and pump cleaning often result in contamination of surroundings of a pumping station by wastewater.

Document U.S. Pat. No. 5,954,484 A discloses a sewage lifting station having at least two solid waste collection chambers for receiving pumped solid waste-contaminated sewage. The station has a collection tank for receiving pre-treated waste water flowing from the solid waste collection chambers via connection pipes. Each solid waste collection chamber is connected to a pump to empty the collection tank via one of the connection pipes and solid waste collection chambers to pump the current of sewage into a pressure pipeline.

SUMMARY

The aforementioned drawbacks are removed by the device for protection of wastewater pumps for wet accumulation chambers according to the present technical solution, in which according to the first embodiment the device for protection of wastewater pumps comprises the following:

A separation chamber provided with a discharge pipe for returning wastewater to a sewerage network, A supply pipe connected to a separation chamber, in order to supply solid particles containing wastewater to the separation chamber;

A reversing valve arranged between a supply pipe and a separation chamber in order to prevent reversing flow of wastewater into the supply pipe, A bidirectional pipe attached to the separation chamber in order to connect the separation chamber with a pump, where the bidirectional pipe serves to supply wastewater from the separation chamber to the pump positioned in a wet accumulation chamber and to return wastewater from the pump to the separation chamber into the discharge pipe, A solid particles separator arranged between the separation chamber and the bidirectional pipe in order to separate solid particles contained in wastewater in the separation chamber, where The bidirectional pipe and the discharge pipe are arranged so as to open into the separation chamber opposite each other in a lower part of the separation chamber.

Instead, wastewater containing solid particles flowing through an inlet pipe into a wet accumulation chamber is directed to the separation chamber through a supply pipe. It further flows from the separation chamber through the solid particles separator via the bidirectional pipe and through a pump into the wet accumulation chamber. The solid particles separator captures solid particles and thereby they accumulate in the separation chamber. Particles having higher dimensional weight (sand, gravel) than a pumped medium accumulate at the bottom of the separation chamber due to sedimentation and they do not pass further onto a pump impeller. After starting the pump pressurized water is pumped back from the wet accumulation chamber through the bidirectional pipe, solid particles separator and through the separation chamber into the discharge pipe and further to a sewerage network. Simultaneously, the separator is washed by reverse pumping of wastewater. A reversing valve precludes reverse flow of wastewater into the supply pipe.

A solid particle is understood to be a solid particle having dimensions exceeding a throughput rate of a pump impeller installed in a pumping station or a particle capable of causing abrasion of blades of the pump impeller. Sand, gravel as well as fabrics, hygienic tissues, foils of various types, clusters of various materials and the likes can form the solid particle.

Preferably, the separation chamber is shaped as a cylinder that may be arranged either vertically or horizontally. The separation chamber comprises an upper part, bottom and side wall/walls. The separation chamber further comprises openings for respective pipes.

A bidirectional pipe and a discharge pipe are attached in a lower part of the separation chamber so that their orifices are situated opposite each other across the separation chamber. The lower part of the separation chamber is meant to be a space immediately above the bottom of the separation chamber. Such arrangement results in that solid particles pumped together with wastewater accumulated at the bottom of the separation chamber are discharged from the separation chamber into the discharge pipe and transported further to the sewerage network or to the wastewater treatment plant. That results in self-cleaning of the separation chamber from separated solid particles.

Preferably, the supply pipe is situated so that it opens into the separation chamber on its top. The reversing valve may consist of for example a seat and a float ball. During pumping water pressure presses the float ball into the seat preventing backflow of wastewater.

Preferably, the discharge pipe directs from a side wall of the chamber first obliquely upward at an angle of 30° to 70° with respect to the bottom of the separation chamber, more preferably at an angle of 50° and then it is curved so that it is directed perpendicularly upward. It is an advantage of said embodiment that the pipe does not include a right angle and solid particles are discharged through the discharge pipe without any problems by water pressure.

According to another preferred embodiment the bidirectional pipe is branched. One branch opens through a side wall into the lower part of the separation chamber, like in the previous case, and the other branch opens through the side wall into the upper part of the separation chamber. The upper part of the separation chamber is understood as a space of the separation chamber below the reversing valve. Both branches are attached to the separation chamber through an individual solid particles separator. Branching of the bidirectional pipe into two height levels results in enhancement of hydraulic characteristics in the separation chamber. After the pump is switched on, pressurized flow is partially directed through one branch of the bidirectional pipe to the upper part of the separation chamber and a part of the pressurized flow is directed through another branch of the bidirectional pipe to the lower part of the separation chamber. Said results in mixing of the contents of the separation chamber in the immediate moment prior to the discharge of the captured solid particles into the discharge pipe itself. The self-cleaning effect as such is even increased by the present solution and a risk that the separation chamber is not completely cleared of the separated solid particles is minimal.

Greater filtration capacity of the device that also deals with eventual occurrence of an impact plurality of deposited solid particles is another advantage of the branched bidirectional pipe. Said situation is not exceptional in the practice of sewerage network operations. Accumulation of solid particles at the bottom of the separation chamber may result in partial or total blockage of the flow capacity (clogging) of the first solid particles separator positioned in the lower part of the separation chamber. In the branched bidirectional pipe wastewater filtration will continue through the second solid particles separator positioned in the upper part of the separation chamber and through the upper branch of the bidirectional pipe. After the pump is switched on, wastewater is pumped reversely causing washing the separators and cleaning the separation chamber.

According to another embodiment the supply pipe is in the form of an inlet trough. From a certain height walls of the inlet trough are provided with filtration perforations. The function of the trough is on one hand directing water into the separation chamber, but simultaneously also separation and filtration of storm sewage through perforations in the side walls of the trough. Size of perforations in the side walls of the trough is dimensioned according to the throughput rate of the pump impeller installed in the pumping station. Arrangement of perforations on the walls, their amount and design are determined by the value of the maximal critical inlet into the pumping station. Accordingly, an average daily flow is securely let into the separation chamber through the inlet trough and eventual critical flow is passed through the filtration perforation directly into the wet accumulation chamber in order to avoid flooding of the separation chamber. Filtration perforations prevent passing the solid particles of sizes greater than the throughput rate of the pump impeller into the accumulation chamber and said solid particles are passed through into the separation chamber by the trough.

The accumulation chamber may comprise a plurality of pumps, in that case each pump is provided with a separate device according to the present solution. Said devices may, however, share one supply pipe or inlet trough.

A sieve having opening sizes dimensioned according to the throughput rate of a pump impeller may be a solid particles separator. A disadvantage of the sieve is that it is quickly clogged, in particularly, when there are fabrics or disposable hygienic tissues and the like in wastewater. In addition, when wastewater is pumped reversely the separator is only partially washed as the said fabrics tend to enmesh into the sieve.

According to a preferred embodiment, a device according to the present teaching may comprise a rod solid particles separator. The rod separator consists of a frame provided about the inner circumference with rods having at minimum two or three or more lengths. The frame may preferably be of an annular shape. Alternatively, the outer circumference of the frame may be of a square, rectangular or other geometric shape. Rods are arranged alternately (long, short, long, short) on the frame. Rods protrude radially from the body plane onto one side at an angle in such a manner that a surface that longitudinally intersects all rods forms a truncated cone or truncated pyramid (frustum). Rods are arranged so that a space between two neighboring rods and at the same time space between free ends of any two long rods does not exceed the size the throughput rate of the pump impeller is dimensioned for. In practice a distance between the rods is in the range of 15 to 100 mm. Rod length may be for example 20 and 50 mm, 20 and 60 mm, 15 and 60 mm, 20 and 80 mm and the like. Length of the rods primarily depends on the throughput rate of the pump impeller. Said rod solid particles separator is positioned between a flange of the bidirectional pipe and a flange of the separation chamber in a way the rods are directed into the space of the separation chamber. The rod separator may be preferably provided with means for fastening in the flange e.g. in the form of openings. The rod separator may be preferably provided with at least one groove for mounting a sealing.

Increasing of filtration surface of the solid particles separator resulting in lowering a risk of clotting the separator is an advantage of the rod design of the separator. In addition, during reverse pumping of wastewater the separator is washed more thoroughly as fabrics tend to slip from the rods.

The pump is commonly positioned at the bottom of the wet accumulation chamber and according to the present technical solution it may be attached to bidirectional pipe of the device by means of a dismountable coupling through a pipe of the pump. The discharge pump of the device may be connected by a dismountable coupling to the discharge pump of the pumping station. Lengths of individual pipes depend on a depth of the pumping station and a distance of the inlet pipe of wastewater from the bottom of the pumping station.

For better handling during installation of the device according to the present technical solution into a pumping station the bidirectional pipes and the pipe of the pump as well as the discharge pipe and the discharge pipe of the pumping station are connected with dismountable couplings at the separation chamber proximity.

The device according to the present teaching provides for the pump not to come into contact with solid particles that cause its excessive wearing-off, clogging and breakdowns.

The device according to the present teaching provides a plurality of economic and ecologic advantages, namely the device can be installed into wet chambers of new as well as a majority of existing pumping stations without a requirement of building modifications of the pumping stations. Accordingly, in majority cases the device requires no other than already existing space in the pumping station, nor further construction works. After installation, frequency of dispatching of operator's maintenance workers to the pumping stations for pump cleaning, maintenance and repair purposes decreases, pump life increases, the need for handling the rakings is eliminated resulting in reduction of ecological burden of environment in the surrounding of the pumping station.

DETAILED DESCRIPTION

Example 1

Figure 1:
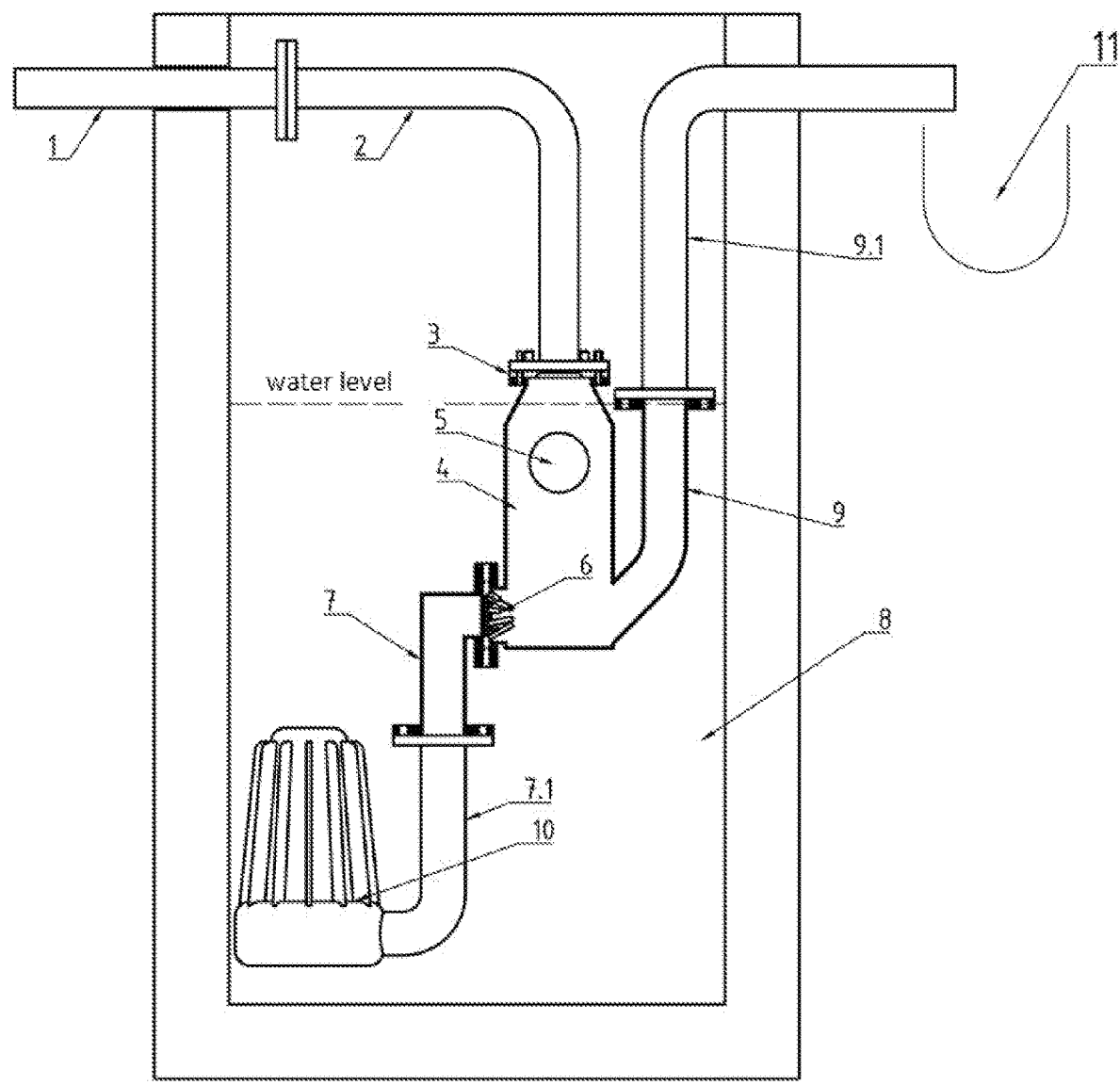
FIG. 1 shows a configuration of the device according to the present teaching in a wet accumulation chamber of a pumping station.

FIG. 1 shows a device for protection of wastewater pumps comprising separation chamber 4 substantially in the form of a perpendicularly positioned cylinder. Said separation chamber is provided in its lower part with discharge pipe 9 of the chamber that is further connected by a dismountable coupling onto discharge pipe 9.1 of a pumping station, that is further connected to sewerage network 11. The device further comprises supply pipe 2, connected to inlet pipe 1. Supply pipe 2 is from another side connected from the top to separation chamber 4 to inlet wastewater into separation chamber 4. A reversing valve for preventing reverse flow of wastewater into supply pipe 2 is positioned between supply pipe 2 and separation chamber 4. Said valve consists of seat 3 arranged on supply pipe 2 and corresponding float ball 5 positioned in separation chamber 4. Bidirectional pipe 7 is connected on chamber 4 in the lower part of separation chamber 4 opposite the orifice of discharge pipe 9 of the chamber. Said bidirectional pipe 7 is connected to pump pipe 7.1 and connects the device with pump 10 positioned in wet accumulation chamber 8. Rod separator 6 of solid particles is arranged between separation chamber 4 and bidirectional pipe 7. The role of the rod separator 6 of solid particles is separating solid particles contained in wastewater in separation chamber 4.

During operation of the device wastewater flows from separation chamber 4, through rod solid particles separator 6 via bidirectional pipe 7 into pump 10 and consequently to wet accumulation chamber 8. Solid particles contained in wastewater are filtrated by solid particles separator 6 and are accumulated at the bottom of separation chamber 4. When water surface in wet accumulation chamber 8 reaches a set switching level pump 10 is switched on. After pump 10 is switched on wastewater from wet accumulation chamber 8 is pumped back by pump 10 through bidirectional pipe 7 and rod solid particles separator 6 into separation chamber 4. An increasing level of pumped wastewater in separation chamber 4 presses float ball 5 onto seat 3, closing the inlet into supply pipe 2. Pumped waster continues further from separation chamber 4 into chamber discharge pipe 9 and further to pump station discharge pipe 9.1. Solid particles accumulated at the bottom of separation chamber 4 are also discharge from separation chamber 4 by pressure of pumped water into chamber discharge pipe 9 and through pump station discharge pipe 9.1 they are further transported into sewerage network 11.

Example 2

Figure 2:
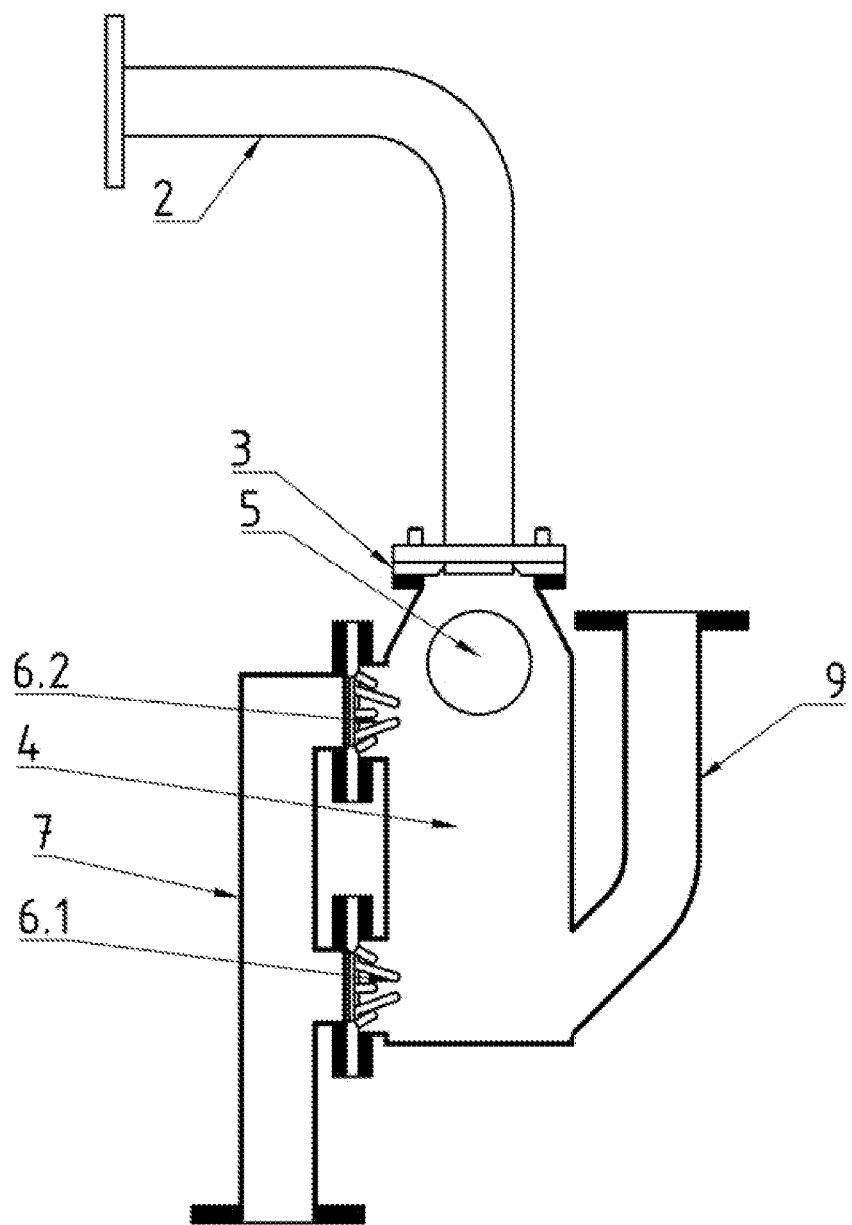
FIG. 2 shows the device according to the present teaching with a branched bidirectional pipe.

FIG. 2 shows a preferred embodiment of the device for pump protection.

The device comprises all parts of the device according to Example 1. The device differs from the device according to Example 1 in that bidirectional pipe 7 is branched. One branch opens into a lower part of separation chamber 4, as in Example 1, and another branch opens into an upper part of separation chamber 4. Both branches are connected to the separation chamber through a separate solid particles separator 6.1, 6.2.

Example 3

Figure 3:
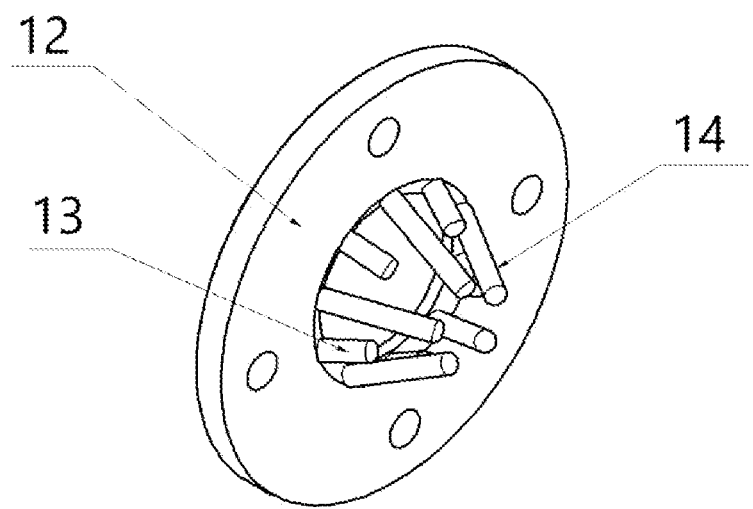
FIG. 3 illustrates a design of a rod solid particles separator.

FIG. 3 shows a rod solid particles separator consisting of frame 12 of annular shape, where said ring is about its inner circumference provided with rods 13 and 14 of at least two lengths. The rods are on the frame, they are arranged alternately (long, short, long, short). Simultaneously, the rods radially protrude from the frame plane into one side at an angle in a way a plane intersecting their surfaces forms a truncated cone (frustum). The rods are arranged so that a space between any two rods does not exceed the size the throughput rate of the pump impeller is dimensioned for. In practice the distance between the rods is in the range of 15 to 100 mm.

Example 4

Figure 4:
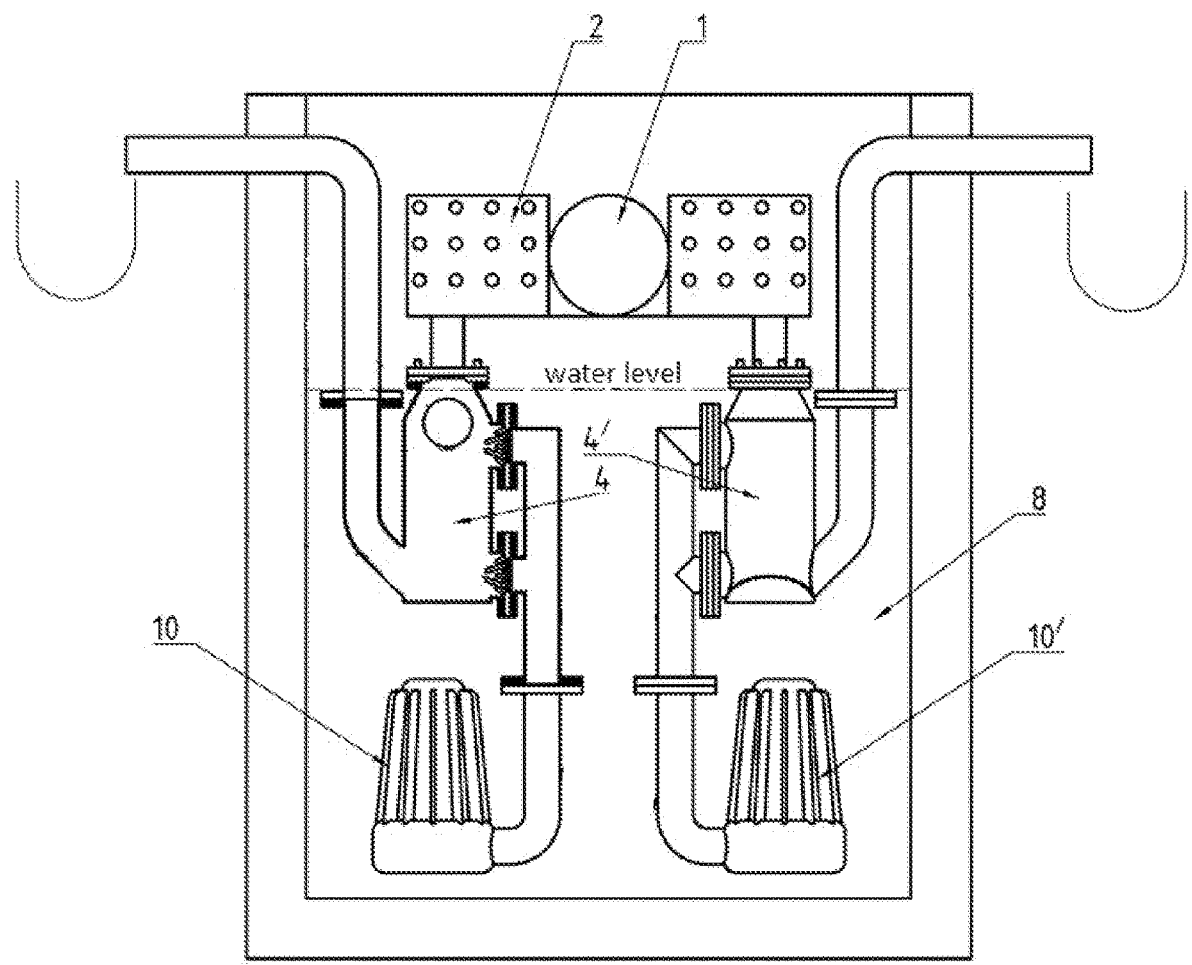
FIG. 4 shows a configuration of devices according to the present teaching in a wet accumulation chamber that contains two pumps and a supply pipe is in the form of an inlet trough.

FIG. 4 shows connection of the devices according to the present teaching in a wet accumulation chamber containing two pumps. The devices are similar to the device described in Example 2. The devices differ from the device in Example 2 in that they comprise only one common supply pipe 2 in a form of a inlet trough. The inlet trough is connected to inlet pipe 1. From a certain height walls of the inlet trough are provided with filtration perforations. Size of the perforations is dimensioned according to the throughput rate of pump impeller 10 and 10'. Arrangement of perforations in the side walls of the inlet trough are determined by a value of the maximal critical inlet into the pumping station. Accordingly, the perforations are arranged in such height of the trough wall that an average daily flow is securely let in to separation chambers 4 and 4' through the inlet trough and eventual critical flow is passed directly into wet accumulation chamber 8.

The invention claimed is:

1. A device for protection of wastewater pumps for wet accumulation chambers, the device comprising:
a separation chamber provided with a discharge pipe for discharge of wastewater into a sewerage network, a supply pipe, connected to the separation chamber, to supply wastewater containing solid particles into the separation chamber, a reversing valve arranged between the supply pipe and the separation chamber in order to prevent reverse flow of wastewater into the supply pipe, a bidirectional pipe, connected to the separation chamber, for connection of the separation chamber to a pump, to convey wastewater from the separation chamber through the pump into a wet accumulation chamber, and for reverse flow of wastewater from the wet accumulation chamber through the pump and the separation chamber into the discharge pipe, a first solid particles separator and a second solid particles separator, each arranged between the separation chamber and the bidirectional pipe, for retaining solid particles contained in wastewater in the separation chamber, wherein the bidirectional pipe and the discharge pipe are arranged such that they open into the separation chamber opposite to each other in a lower part of the separation chamber, wherein the bidirectional pipe is branched, where a first branch opens into the lower part of the separation chamber and a second branch opens into an upper part of the separation chamber, such that the first and second branches are connected to the separation chamber by the first solid particles separator and the second solid particles separators, respectively, and wherein the supply pipe is formed as a perforated inlet trough.

2. The device according to claim 1, wherein the supply pipe is connected to the separation chamber at a top of the separation chamber, above the upper part of the separation chamber.

3. The device according to claim 2, wherein the reversing valve consists of a seat and a float ball positioned in the separation chamber.

4. The device according to claim 1, wherein the discharge pipe extends from the separation chamber slantwise-upwards at an angle of 30° to 70° with respect to a bottom surface of the separation chamber.

5. The device according to claim 1, wherein each of the first solid particles separator and the second solid particles separators contains a frame, provided on its inner circumference with rods of at least two lengths, wherein the rods are on the frame arranged alternatively, long rod, short rod, wherein the long and short rods protrude radially at an angle from a frame plane on one side of the frame such that a surface that longitudinally intersects all rods forms a truncated cone or pyramid, and wherein the rods are arranged such that a space between any two neighboring rods and a space between free ends of any two long rods do not exceed a size for which a throughput rate of an impeller of the pump is dimensioned.

6. The device according to claim 5, wherein the frame is formed as a ring.

7. The device according to claim 4, wherein the angle is 50°.

* * * * *